(12) United States Patent
Lim et al.

(10) Patent No.: US 12,460,988 B2
(45) Date of Patent: Nov. 4, 2025

(54) SEAL MONITORING SYSTEM

(71) Applicant: Cameron International Corporation, Houston, TX (US)

(72) Inventors: Haw Keat Lim, Singapore (SG); Yong Wee Lee, Singapore (SG); Albert Christian, Singapore (SG); Boon Hao Hee, Singapore (SG); Ping Cheng Lai, Singapore (SG)

(73) Assignee: Cameron International Corporation, Houston, TX (US)

( * ) Notice: Subject to any disclaimer, the term of this patent is extended or adjusted under 35 U.S.C. 154(b) by 269 days.

(21) Appl. No.: 18/260,401

(22) PCT Filed: Jan. 19, 2022

(86) PCT No.: PCT/US2022/012933
§ 371 (c)(1),
(2) Date: Jul. 5, 2023

(87) PCT Pub. No.: WO2022/159458
PCT Pub. Date: Jul. 28, 2022

(65) Prior Publication Data
US 2024/0053224 A1    Feb. 15, 2024

Related U.S. Application Data

(60) Provisional application No. 63/139,417, filed on Jan. 20, 2021.

(51) Int. Cl.
*G01M 3/28* (2006.01)
*G01L 9/04* (2006.01)
*G01M 13/005* (2019.01)

(52) U.S. Cl.
CPC ............. *G01M 3/2869* (2013.01); *G01L 9/04* (2013.01); *G01M 13/005* (2013.01)

(58) Field of Classification Search
CPC ........ G01M 3/16; G01M 3/182; G01M 3/183; G01M 3/186; G01M 3/187; G01M 3/2815;
(Continued)

(56) References Cited

U.S. PATENT DOCUMENTS

2006/0144622 A1   7/2006  Bailey
2014/0373619 A1  12/2014  Slay
(Continued)

FOREIGN PATENT DOCUMENTS

WO      9429572 A1   12/1994
WO   2015175273 A1   11/2015

OTHER PUBLICATIONS

International Search Report and Written Opinion issued in the PCT Application PCT/US2022/012933, dated Apr. 20, 2022 (9 pages).

*Primary Examiner* — Paul M. West
(74) *Attorney, Agent, or Firm* — Jeffrey D. Frantz

(57) ABSTRACT

A seal monitoring system includes at least one sensor configured to couple to an outer surface of a housing and to output a sensor signal indicative of deformation of the housing. The housing is configured to receive an insert within an internal cavity of the housing, and an engageable seal is configured to selectively establish a seal between the insert and the housing. The seal monitoring system also includes a controller communicatively coupled to the at least one sensor. The controller includes a memory and a processor, the controller is configured to determine a degree of engagement of the engageable seal based on the deformation of the housing. Additionally or alternatively, the controller is configured to determine a fluid pressure within the housing based on the deformation of the housing.

18 Claims, 4 Drawing Sheets

(58) Field of Classification Search
CPC ...... G01M 3/2869; G01M 3/36; G01M 3/363;
G01M 3/366; G01M 13/005; G01L 9/04
See application file for complete search history.

(56) References Cited

U.S. PATENT DOCUMENTS

| | | |
|---|---|---|
| 2015/0285054 A1 | 10/2015 | Johnson |
| 2019/0226295 A1 | 7/2019 | Zonoz |
| 2020/0300051 A1 | 9/2020 | Johnson |
| 2021/0040812 A1* | 2/2021 | Costa de Oliveira ....................... E21B 33/12955 |
| 2022/0170812 A1* | 6/2022 | McKay ................. E21B 17/028 |

* cited by examiner

SEAL MONITORING SYSTEM

CROSS REFERENCE TO RELATED APPLICATION

This application is a National Stage Entry of International Application No. PCT/US2022/012933, filed Jan. 19, 2022, which claims priority from and the benefit of U.S. Provisional Application Ser. No. 63/139,417, entitled "SEAL MONITORING SYSTEM", filed Jan. 20, 2021, which is hereby incorporated by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. In some drilling and production systems, a hanger, such as a tubing hanger, may be used to suspend a string (e.g., piping for a flow in and/or out of a well). Such a hanger may be disposed within a spool of a wellhead, which supports both the hanger and the string. For example, a tubing hanger may be lowered into a tubing spool by a drilling string. During the running or lowering process, the tubing hanger may be coupled to the drilling string by a tubing hanger running tool (THRT). Once the tubing hanger has been lowered into a landed position within the tubing spool, the tubing hanger may be permanently locked into position. The THRT may then be uncoupled from the tubing hanger and extracted from the wellhead by the drilling string.

Furthermore, an engageable seal may be disposed between the tubing hanger and the tubing spool. The engageable seal may be engaged (e.g., energized, set) during the landing of the tubing hanger or after the tubing hanger is landed within the tubing spool. Once the engageable seal is engaged, the engageable seal may substantially block flow of hydrocarbons between the tubing hanger and the tubing spool. If the engageable seal is not fully engaged during/after the landing process, the state of the engageable seal may not be determined until the wellhead is pressure tested. At that point, the process of engaging an improperly engaged engageable seal may be difficult, time-consuming, and expensive.

In addition, the process of determining pressures within fluid containment structures (e.g., the tubing spool, other housing(s), pipes(s), etc.) during fluid production may be complex and time-consuming. For example, if the fluid containment structures are disposed within seawater (e.g., as part of a subsea resource extraction system), an underwater remote operated vehicle (ROV) may be used to monitor fluid pressures. Pressure gauges may be positioned at the fluid containment structures and configured to provide visual indications of the fluid pressures within the fluid containment structures (e.g., via needles pointing to respective marks associated with monitored pressures). The ROV may be positioned proximate to each gauge, and a camera may be directed toward the gauge to convey the visual pressure indication to the ROV operator. Additionally, with regard to surface resource extraction systems, the pressure gauges may be located at remote regions that are difficult to access. Accordingly, the process of monitoring fluid pressures within fluid containment structures of a surface or subsea resource extraction system may be significantly time-consuming and expensive.

BRIEF DESCRIPTION

In certain embodiments, a seal monitoring system includes at least one sensor configured to couple to an outer surface of a housing and to output a sensor signal indicative of deformation of the housing. The housing is configured to receive an insert within an internal cavity of the housing, and an engageable seal is configured to selectively establish a seal between the insert and the housing. The seal monitoring system also includes a controller communicatively coupled to the at least one sensor. The controller includes a memory and a processor, the controller is configured to determine a degree of engagement of the engageable seal based on the deformation of the housing, and the controller is configured to output a first output signal indicative of the degree of engagement of the engageable seal. Additionally or alternatively, the controller is configured to determine a fluid pressure within the housing based on the deformation of the housing, and the controller is configured to output a second output signal indicative of the fluid pressure.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
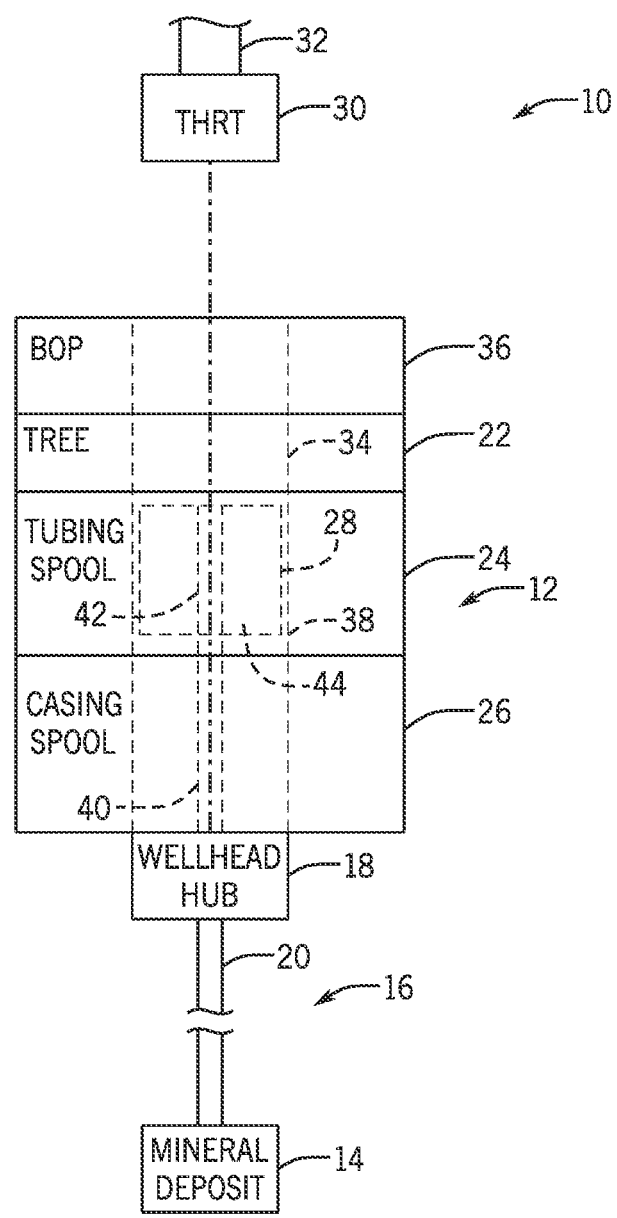
FIG. 1 is a block diagram of an embodiment of a resource extraction system.

FIG. 1 is a block diagram of an embodiment of a resource extraction system 10. The resource extraction system 10 may be configured to extract various minerals and natural resources, including hydrocarbons (e.g., oil and/or natural gas) from the earth, or the resource extraction system may be configured to inject substances into the earth. In some embodiments, the resource extraction system 10 is land-based (e.g., a surface system) or subsea (e.g., a subsea system). As illustrated, the resource extraction system 10 includes a wellhead 12 coupled to a mineral deposit 14 via a well 16. The well 16 includes a wellhead hub 18 and a well-bore 20. The wellhead hub 18 may include a large diameter hub that is disposed at the termination of the well-bore 20. The wellhead hub 18 provides for the connection of the wellhead 12 to the well 16.

The wellhead 12 includes multiple components that control and regulate activities and properties associated with the well 16. For example, the wellhead 12 may include bodies, valves, and seals that route produced minerals from the mineral deposit 14, provide for regulating pressure in the well 16, and provide for the injection of chemicals into the well-bore 20 (down-hole). In the illustrated embodiment, the wellhead 12 includes a production tree 22, a tubing spool 24, a casing spool 26, and a tubing hanger 28. The resource extraction system 10 may include other device(s) that are coupled to the wellhead 12 and/or device(s) that are used to assemble and/or control various components of the wellhead 12. For example, in the illustrated embodiment, the resource extraction system 10 includes a tubing hanger running tool (THRT) 30 suspended from a drilling string 32. In certain embodiments, the tubing hanger 28 supports tubing (e.g., a tubing string). During a running or lowering process, the THRT 30 is coupled to the tubing hanger 28, thereby coupling the tubing hanger 28 to the drilling string 32. The THRT 30, which is coupled to the tubing hanger 28, is lowered (e.g., run) to the wellhead 12. Once the tubing hanger 28 has been lowered into a landed position within the tubing spool 24, the tubing hanger 28 may be permanently locked into position. The THRT 30 may then be uncoupled from the tubing hanger 28 and extracted from the wellhead 12 by the drilling string 32, as illustrated. While the tubing hanger 28 is landed in the tubing spool 24 in the illustrated embodiment, in other embodiments, the tubing spool may be omitted, and the tubing hanger may be landed in another suitable portion of the wellhead.

The production tree 22 may include a variety of flow paths (e.g., bores), valves, fittings, and controls for operating the well 16. For instance, the production tree 22 may include a frame that is disposed about a tree body, a flow-loop, actuators, and valves. Further, the production tree 22 may be in fluid communication with the well 16. As illustrated, the production tree 22 includes a tree bore 34. The tree bore 34 provides for completion and workover procedures, such as the insertion of tools (e.g., the tubing hanger 28) into the wellhead 12, the injection of various chemicals into the well 16 (down-hole), and the like. Further, minerals extracted from the well 16 (e.g., oil and/or natural gas) may be regulated and routed via the production tree 22. For instance, the production tree 22 may be coupled to a jumper or a flowline that is tied back to other components, such as a manifold. Accordingly, produced minerals flow from the well 16 to the manifold via the production tree 22 before being routed to shipping or storage facilities. A blowout preventer (BOP) 36 may also be included, either as a part of the production tree 22 or as a separate device. The BOP 36 may include a variety of valves, fittings, and controls to block oil, gas, or other fluid from exiting the well in the event of an unintentional release of pressure or an overpressure condition.

The tubing spool 24 provides a base for the production tree 22. The tubing spool 24 has a tubing spool bore 38, and the casing spool 26 has a casing spool bore 40. The bores 38 and 40 connect (e.g., enable fluid communication between) the tree bore 34 and the well 16. Thus, the bores 38 and 40 may provide access to the well-bore 20 for various completion and workover procedures. For example, components may be run down to the wellhead 12 and disposed in the tubing spool bore 38 and/or the casing spool bore 40 to seal-off the well-bore 20, to inject chemicals down-hole, to suspend tools down-hole, to retrieve tools, and the like.

The well-bore 20 may contain elevated fluid pressures. For example, pressures within the well-bore 20 may exceed 10,000 pounds per square inch (PSI), 15,000 PSI, or 20,000 PSI. Accordingly, resource extraction systems 10 employ various mechanisms, such as mandrels, seals, plugs, and valves, to control and regulate the well 16. For example, the illustrated tubing hanger 28 may be disposed within the wellhead 12 to secure tubing suspended in the well-bore 20 and to provide a path for hydraulic control fluid, chemical injection, electrical connection(s), and the like. The tubing hanger 28 includes a central bore 42 that extends through the center of a body 44 of the tubing hanger 28, and that is in fluid communication with the casing spool bore 40 and the well-bore 20. The central bore 42 is configured to facilitate flow of hydrocarbons through the body 44 of the tubing hanger 28.

In certain embodiments, an engageable seal (e.g., metal seal, packoff seal, etc.) may be disposed within the tubing spool bore 38 between the tubing spool 24 and the tubing hanger 28. The engageable seal may be engaged (e.g., energized, set) during landing of the tubing hanger 28 or after the tubing hanger 28 is landed within the tubing spool 24. For example, the weight of the tubing (e.g., tubing string) may drive the engageable seal into engagement, rotation of a locking ring may drive the engageable seal into engagement, actuation of a component of the THRT 30 may drive the engageable seal into engagement, or a combination thereof. Once the engageable seal is engaged, the engageable seal may substantially block flow of hydrocarbons through the tubing spool bore 38 between the tubing spool 24 and the tubing hanger 28.

As discussed in detail below, the resource extraction system 10 may include a seal monitoring system configured to determine a degree of engagement of the engageable seal without performing a pressure test on the wellhead 12. Additionally or alternatively, the resource extraction system 10 may include a pressure monitoring system configured to monitor pressure within a fluid containment structure of the wellhead 12. In certain embodiments, the seal monitoring system and the pressure monitoring system may be combined into a single system (e.g., seal/pressure monitoring system). In certain embodiments, the seal/pressure monitoring system includes one or more sensors (e.g., strain gauge (s), strain meter(s), piezoelectric sensor(s), etc.) configured to couple to an outer surface of the tubing spool 24. Each sensor is configured to output a sensor signal indicative of deformation of the tubing spool 24. In addition, the seal/pressure monitoring system includes a controller communicatively coupled to the sensor(s), in which the controller includes a memory and a processor. In certain embodiments (e.g., in embodiments of the seal monitoring system), the controller is configured to determine the degree of engagement of the engageable seal based on the deformation of the tubing spool 24, and the controller is configured to output an output signal indicative of the degree of engagement of the engageable seal. Accordingly, the degree of engagement of the engageable seal may be determined without performing a pressure test on the wellhead 12, thereby substantially reducing the time and/or expense associated with identifying an improperly engaged engageable seal. Additionally or alternatively, in certain embodiments (e.g., in embodiments of the pressure monitoring system), the controller is configured to determine a fluid pressure within the tubing spool 24 based on the deformation of the tubing spool 24, and the controller is configured to output an output signal indicative of the fluid pressure. Accordingly, the fluid pressure within the tubing spool may be monitored from a remote location, thereby obviating use of an underwater remote operated vehicle (ROV) to monitor the fluid pressure within a subsea tubing spool or obviating the process of traveling to a surface tubing spool to visually monitor pressure gauge(s) at the tubing spool. As a result, the costs and complexity associated with monitoring fluid pressure may be substantially reduced.

Figure 2:
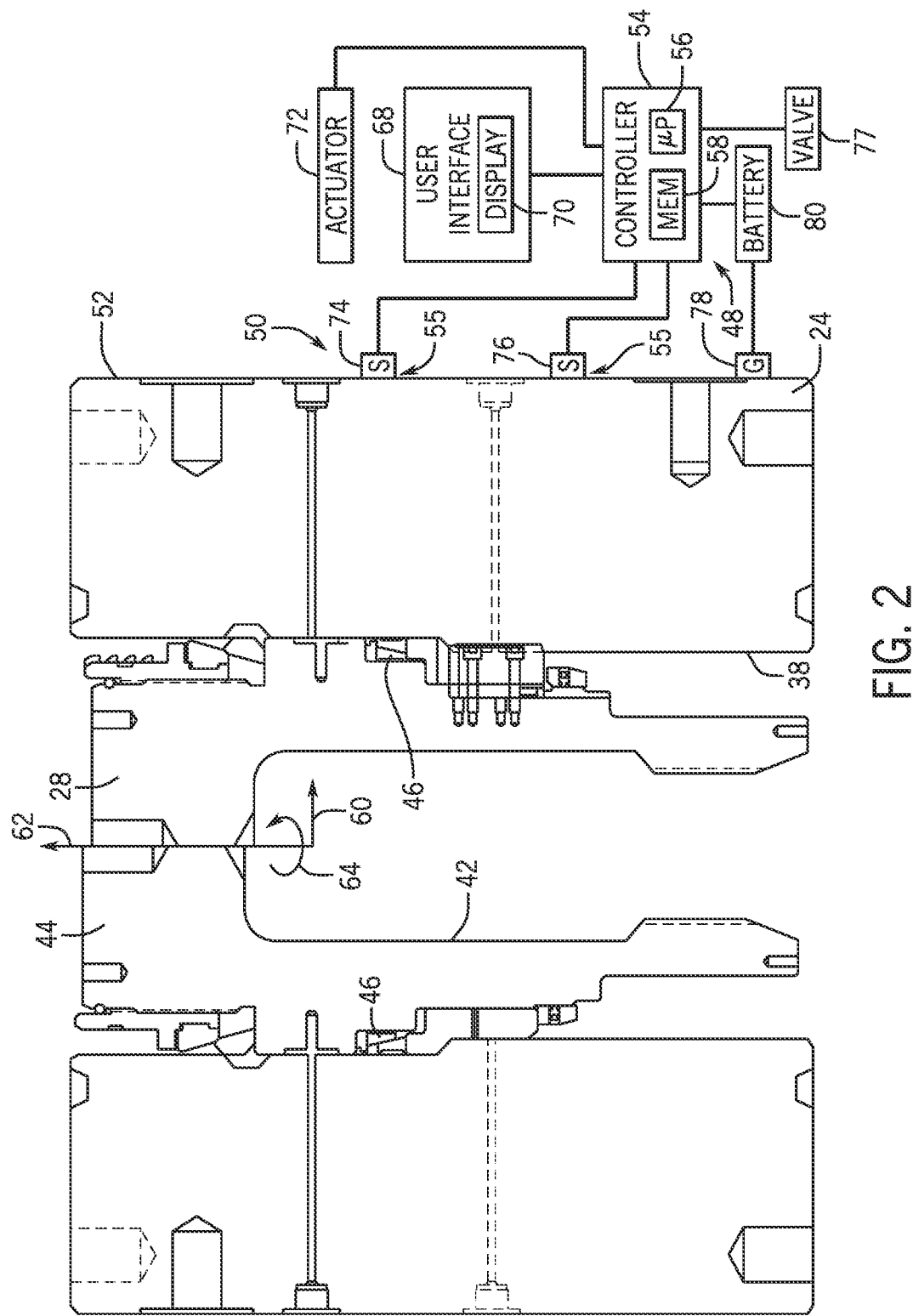
FIG. 2 is a cross-sectional view of an embodiment of a tubing spool that may be employed within the resource extraction system of FIG. 1 and a block diagram of an embodiment of a seal/pressure monitoring system.

FIG. 2 is a cross-sectional view of an embodiment of a tubing spool 24 that may be employed within the resource extraction system of FIG. 1 and a block diagram of an embodiment of a seal/pressure monitoring system 48. As illustrated, a tubing hanger 28 (e.g., insert) is disposed within the tubing spool bore 38 (e.g., internal cavity) of the tubing spool 24 (e.g., housing). In addition, an engageable seal 46 (e.g., metal seal) is disposed within the tubing spool bore 38 between the tubing spool 24 and the body 44 of the tubing hanger 28. The left and right sides of the cross-sectional view of the tubing spool 24 represent different states of the engageable seal 46. As shown on the left side of the tubing spool, the engageable seal 46 is partially engaged, and as shown on the right side of the tubing spool, the engageable seal 46 is engaged (e.g., fully engaged). As previously discussed, the engageable seal 46 may be engaged (e.g., energized, set) during landing of the tubing hanger 28 or after the tubing hanger 28 is landed. For example, the weight of the tubing (e.g., tubing string) may drive the engageable seal 46 into engagement, rotation of a locking ring may drive the engageable seal 46 into engagement, actuation of a component of the THRT may drive the engageable seal 46 into engagement, or a combination thereof. Once the engageable seal is engaged, the engageable seal 46 may substantially block flow of hydrocarbons through the tubing spool bore 38 between the tubing spool 24 and the tubing hanger 28.

The seal/pressure monitoring system 48 (e.g., the seal monitoring system) may be used to determine a degree of engagement of the engageable seal 46. In the illustrated embodiment, the seal/pressure monitoring system 48 includes one or more sensors 50 coupled to an outer surface 52 of the tubing spool 24. At least one sensor 50 may be coupled to the outer surface 52 of the tubing spool 24 before the tubing spool is transported to the well site, and/or at least one sensor 50 may be coupled to the outer surface 52 of the tubing spool 24 after the tubing spool arrives at the well site. Each sensor 50 may be coupled to the outer surface 52 of the tubing spool 24 by any suitable type(s) of connection(s). For example, in the illustrated embodiment, each sensor 50 is coupled to the outer surface 52 of the tubing spool 24 by an adhesive connection 55. However, in other embodiments, at least one sensor may be coupled to the outer surface of the tubing spool by other suitable type(s) of connection(s) (e.g., alone or in combination with the adhesive connection), such as via fastener(s), via a threaded connection, via a magnetic connection, via a strap extending around the tubing spool, via other suitable type(s) of connection(s), or a combination thereof. Furthermore, in certain embodiments, at least one sensor may be embedded within the structure of the tubing spool.

Each sensor 50 is configured to output a sensor signal indicative of deformation of the tubing spool 24. The seal/pressure monitoring system 48 also includes a controller 54 communicatively coupled to the sensor(s) 50. In certain embodiments, the controller 54 is an electronic controller having electrical circuitry configured to determine a degree of engagement of the engageable seal 46 based on the deformation of the tubing spool 24. In the illustrated embodiment, the controller 54 includes a processor, such as the illustrated microprocessor 56, and a memory device 58. The controller 54 may also include one or more storage devices and/or other suitable components. The processor 56 may be used to execute software, such as software for determining the degree of engagement of the engageable seal 46, and so forth. Moreover, the processor 56 may include multiple microprocessors, one or more "general-purpose" microprocessors, one or more special-purpose microprocessors, and/or one or more application specific integrated circuits (ASICs), or some combination thereof. For example, the processor 56 may include one or more reduced instruction set (RISC) processors.

The memory device 58 may include a volatile memory, such as random access memory (RAM), and/or a nonvolatile memory, such as read-only memory (ROM). The memory device 58 may store a variety of information and may be used for various purposes. For example, the memory device 58 may store processor-executable instructions (e.g., firmware or software) for the processor 56 to execute, such as instructions for determining the degree of engagement of the engageable seal 46, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining the degree of engagement of the engageable seal, etc.), and any other suitable data.

As the engageable seal 46 engages, the engageable seal 46 may apply an increasing force to the tubing spool 24 along a radial axis 60. For example, while the engageable seal 46 is disengaged, the engageable seal 46 may apply a minimum force (e.g., zero force) to the tubing spool 24 along the radial axis 60, and while the engageable seal 46 is engaged (e.g., fully engaged), the engageable seal may apply a maximum force to the tubing spool 24 along the radial axis 60. In addition, the force applied by the engageable seal 46 to the tubing spool 24 along the radial axis 60 may increase between the minimum force and the maximum force as the engageable seal 46 engages. As the force applied to the tubing spool 24 along the radial axis 60 increases, the deformation of the tubing spool 24 (e.g., along the radial axis 60) at the longitudinal location (e.g., location along a longitudinal axis 62) of the engageable seal 46 may increase.

Accordingly, the controller 54 may determine the degree of engagement of the engageable seal 46 based on the deformation of the tubing spool 24 (e.g., along the radial axis 60), which is monitored by the sensor(s) 50. As a result, the degree of engagement of the engageable seal may be determined without performing a pressure test on the wellhead, thereby substantially reducing the time and/or expense associated with identifying an improperly engaged engageable seal. Furthermore, determining the degree of engagement of the engageable seal without performing a pressure test improves the operation of the controller.

The sensor(s) 50 may include any suitable device(s) configured to monitor the deformation of the tubing spool 24. For example, in certain embodiments, at least one sensor 50 includes strain gauge(s) coupled to the outer surface 52 of the tubing spool 24. Furthermore, in certain embodiments, at least one sensor may include other suitable type(s) of deformation monitoring device(s) (e.g., alone or in combination with the strain gauge(s)), such as strain meter(s), linear variable differential transformer(s), piezoelectric sensor(s), other suitable type(s) of deformation monitoring device(s), or a combination thereof. In addition, while the sensor(s) are coupled to the outer surface 52 of the tubing spool 24 in the illustrated embodiment, in other embodiments, at least one sensor may be coupled to an inner surface of the tubing spool (e.g., along the tubing spool bore). While contact sensors are disclosed above, in certain embodiments, at least one sensor may include non-contact deformation monitoring device(s), such as optical sensor(s), infrared sensor(s), holographic interferometer(s), other suitable type(s) of non-contact deformation monitoring device(s), or a combination thereof. In embodiments including non-contact deformation monitoring device(s), the non-contact deformation monitoring device(s) may be positioned radially outward from the tubing spool and directed toward the tubing spool.

In certain embodiments, in response to determining the degree of engagement of the engageable seal 46, the controller 54 may output an output signal (e.g., first output signal) indicative of the degree of engagement of the engageable seal 46. In the illustrated embodiment, the seal/pressure monitoring system 48 includes a user interface 68 communicatively coupled to the controller 54. The user interface 68 may be configured to receive input from an operator and/or to provide information to the operator. In the illustrated embodiment, the user interface 68 includes a display 70 configured to provide visual information to the operator. The user interface may also include a speaker configured to provide audible information to the operator. In addition, the user interface may include one or more input devices (e.g., button(s), switch(es), knob(s), mouse, keyboard, etc.) configured to receive input from the operator. For example, the display of the user interface may include a touch screen interface configured to receive input from the operator. In certain embodiments, the controller 54 is configured to output the output signal indicative of the degree of engagement of the engageable seal 46 to the user interface 68, and the user interface 68 may present an indication of the degree of engagement of the engageable seal 46 to the operator (e.g., visually via the display 70, audibly via the speaker, etc.).

In certain embodiments, the controller 54 is configured to compare the deformation of the tubing spool 24 to a threshold deformation to determine whether the engageable seal 46 is engaged (e.g., sufficiently engaged, fully engaged, etc.). In such embodiments, the controller 54 is configured to output an output signal (e.g., fourth output signal) indicative of engagement of the engageable seal in response to determining that the deformation is greater than the threshold deformation. The output signal indicative of engagement of the engageable seal may be output alone or in combination with the output signal indicative of the degree of engagement of the engageable seal. The output signal indicative of the engagement of the engageable seal 46 may be output to the user interface 68, and the user interface 68 may present an indication that the engageable seal 46 is engaged to the operator (e.g., visually via the display 70, audibly via the speaker, etc.). Furthermore, in certain embodiments, the controller may output an output signal indicative of the engageable seal being not engaged (e.g., not sufficiently engaged, not fully engaged, etc.) in response to determining that the deformation is less than or equal to the threshold deformation. While the output signals disclosed above are output to the user interface 68 in the illustrated embodiment, in certain embodiments, at least one output signal may be output to another suitable device/system (e.g., alone or in combination with the user interface), such as a remote control system, a remote monitoring system, another suitable device/system, or a combination thereof. Furthermore, while determining whether the engageable seal is engaged by comparing the deformation to a threshold deformation is disclosed above, in certain embodiments, the controller may determine whether the engageable seal is engaged by comparing the degree of engagement to a threshold degree of engagement. For example, the controller may determine that the engageable seal is engaged in response to determining the degree of engagement is greater than a threshold degree of engagement. The controller may output an output signal indicative of engagement of the engageable seal based on the determination, and/or the controller may output an output signal indicative of non-engagement of the engageable seal based on the determination.

In certain embodiments, the seal/pressure monitoring system 48 includes at least one actuator 72 (e.g., electro-mechanical actuator, hydraulic actuator, pneumatic actuator, etc.) communicatively coupled to the controller 54. The actuator(s) 72 are configured to control the degree of engagement of the engageable seal 46. For example, the actuator(s) 72 may be configured to drive a locking ring to rotate, thereby driving the engageable seal 46 to engage. Additionally or alternatively, the actuator(s) 72 may be configured to drive a component of the THRT to drive the engageable seal 46 to engage. The controller 54 may be configured to control the actuator(s) 72 based on the degree of engagement of the engageable seal 46. For example, in response to determining that the engageable seal 46 is not engaged (e.g., not sufficiently engaged, not fully engaged, etc.), the controller 54 may control the actuator(s) 72 to drive the engageable seal 46 into engagement. After controlling the actuator(s) 72, if the controller 54 determines that the engageable seal 46 is not engaged (e.g., not sufficiently engaged, not fully engaged, etc.), the controller 54 may output an output signal (e.g., to the user interface 68) indicative of instructions to inform the operator that the engageable seal 46 is not engaged. Additionally or alternatively, during engagement of the engageable seal 46, the controller may terminate operation of the actuator(s) 72 (e.g., in embodiments in which the actuator(s) are controlled by the controller and/or in embodiments in which the actuator(s) are manually controlled) and/or output an output signal (e.g., in embodiments in which the engageable seal is manually engaged) in response to determining the deformation is greater than (e.g., significantly greater than) the threshold deformation (e.g., to limit the force applied to the engageable seal).

In certain embodiments, for determining seal engagement/degree of seal engagement, the seal/pressure monitoring system 48 may include a single sensor 50 positioned at or proximate to the location of the engageable seal 46 along the longitudinal axis 62. However, in other embodiments, the seal/pressure monitoring system 48 may include multiple sensors 50 distributed along the longitudinal axis 62 and/or along the circumferential axis 64 of the tubing spool 24. For example, in the illustrated embodiment, the seal/pressure monitoring system 48 includes a first sensor 74 and a second sensor 76. The first sensor 74 is positioned at the location of the engageable seal 46 along the longitudinal axis 62, and the second sensor 76 is positioned at a location along the longitudinal axis 62 remote from the engageable seal 46. In certain embodiments, the controller 54 may compare deformation of the tubing spool 24 at the longitudinal location of the first sensor 74/engageable seal 46 to the deformation of the tubing spool 24 at the location of the second sensor 76. The controller 54 may then determine the degree of engagement of the engageable seal based on the comparison. For example, the controller 54 may subtract the deformation at the location of the second sensor from the deformation at the location of the first sensor to substantially remove deformation caused by another source (e.g., landing of the tubing hanger, fluid pressure within the tubing spool bore, etc.), thereby increasing the accuracy of the degree of engagement determination. While the seal/pressure monitoring system includes two sensors 50 disposed along the longitudinal axis 62 in the illustrated embodiment, in other embodiments, the seal/pressure monitoring system may include more or fewer sensors (e.g., 3, 4, 5, 6, 7, 8, or more) disposed along the longitudinal axis.

Furthermore, in certain embodiments, the seal/pressure monitoring system 48 may include multiple sensors 50 positioned at or proximate to the location of the engageable seal 46 along the longitudinal axis 62. For example, a first sensor may overlap a first portion of the engageable seal along the longitudinal axis, and a second sensor may overlap a second portion of the engageable seal along the longitudinal axis. The controller 54 may utilize the deformation at the location of each sensor to determine the degree of engagement of the engageable seal.

In addition, in certain embodiments, the controller may determine the degree of engagement of the engageable seal multiple times as the seal is engaged. Accordingly, the controller may determine a history or trend of seal engagement during the engagement process. For example, the controller may generate a table, a chart, a graph, or a combination thereof, of the degree of engagement of the engageable seal over time. Once the table/chart/graph is determined, the controller may output an output signal to the user interface indicative of the table/chart/graph, and the user interface may present a visual representation of the table/chart/graph (e.g., on the display). Furthermore, determining the degree of engagement multiple times as the seal is engaged may facilitate control of the actuator(s) based on the degree of engagement. For example, the controller may terminate operation of the actuator(s) in response to determining the engageable seal is engaged (e.g., to limit the force applied to the engageable seal). Additionally or alternatively, the controller may output a control signal (e.g., to the user interface) in response to determining the engageable seal is engaged. In addition, the controller may determine the degree of engagement of the engageable seal and/or the deformation prior to operation of the well (e.g., after the tubing hanger landing process is complete). The controller may also determine the degree of engagement and/or the deformation during operation of the well (e.g., to determine whether the engageable seal becomes at least partially disengaged). For example, a reduction in seal engagement (e.g., to a degree at or below a threshold degree of engagement, by a threshold percentage, by a threshold degree, etc.) and/or a reduction in deformation (e.g., to a deformation at or below the threshold deformation, by a threshold percentage, by a threshold deformation, etc.) may be indicative of a reduction in sealing effectiveness. Accordingly, the controller may output an output signal (e.g., to the user interface) indicative of a reduction in sealing effectiveness in response to identifying a decrease in the degree of seal engagement (e.g., to a degree at or below a threshold degree of engagement, by a threshold percentage, by a threshold degree, etc.) and/or in response to identifying a decrease in the deformation (e.g., to a deformation at or below the threshold deformation, by a threshold percentage, by a threshold deformation, etc.).

Furthermore, in certain embodiments, the controller 54 is configured to determine a fluid pressure within the tubing spool 24 based on the deformation of the tubing spool 24 (e.g., along the radial axis 60), which is monitored by the sensor(s) 50. For example, a higher fluid pressure of fluid (e.g., oil, natural gas, etc.) within the tubing spool 24 may cause the tubing spool 24 to deform (e.g., along the radial axis 60) more than a lower fluid pressure of the fluid within the tubing spool 24. In certain embodiments, the controller 54 is configured to determine the fluid pressure within the tubing spool based on the deformation of the tubing spool and a stored relationship between the deformation and the fluid pressure. The stored relationship may be in the form of a table, an empirical formula, a curve, other suitable type(s) of relationship(s), or a combination thereof. As used herein, fluid pressure within a fluid containment structure (e.g., the tubing spool, a pipe, a housing, etc.) corresponds to the pressure differential between the fluid pressure of the fluid within the fluid containment structure and the fluid pressure of the fluid (e.g., air, water, etc.) within the environment surrounding the fluid containment structure. Furthermore, as used herein, "fluid containment structure" refers to any structure that contains pressurized fluid (e.g., liquid and/or gas), such as the tubing spool 24, another suitable component of the wellbore, a conduit (e.g., pipe, hose, etc.), a pressure vessel, or another suitable type of structure.

In certain embodiments, in response to determining the fluid pressure of the fluid within the tubing spool, the controller 54 may output an output signal (e.g., second output signal) indicative of the fluid pressure. For example, the controller 54 may output the output signal indicative of the fluid pressure to the user interface 68. In response to receiving the output signal, the user interface 68 may present an indication of the fluid pressure of the fluid within the tubing spool to the operator (e.g., visually via the display 70, audibly via the speaker, etc.).

In certain embodiments, the controller 54 is configured to compare the fluid pressure to a target fluid pressure. In such embodiments, the controller 54 is configured to output an output signal (e.g., second output signal, third output signal) indicative of a pressure variation in response to determining a difference between the fluid pressure and the target fluid pressure is greater than a threshold value. The output signal indicative of the pressure variation may be output alone or in combination with the output signal indicative of the fluid pressure of the fluid within the tubing spool. For example, the target pressure may be selected or determined based on nominal operation of the resource extraction system. A fluid pressure more than the threshold value below the target fluid pressure may be indicative of a fluid leak within the resource extraction system (e.g., at the engageable seal, etc.) and/or an improper position of a valve configured to control fluid flow through the tubing spool. Furthermore, a fluid pressure more than the threshold value above the target fluid pressure may be indicative of an improper position of a valve configured to control fluid flow through the tubing spool.

While a single threshold value is disclosed above, in certain embodiments, a first threshold value may be used if the fluid pressure is above the target fluid pressure, and a second threshold value, different than the first threshold value, may be used if the fluid pressure is below the target fluid pressure. Furthermore, while the controller is configured to identify pressure variations above and below the target fluid pressure in the illustrated embodiment, in other embodiments, the controller may only be configured to identify a pressure variation above or below the target fluid pressure. Furthermore, while comparing the fluid pressure to a target fluid pressure is disclosed above, in certain embodiments, the deformation of the tubing spool may be compared to a target deformation. In such embodiments, the controller may output the output signal (e.g., second output signal, third output signal) indicative of a pressure variation in response to determining a difference between the deformation and the target deformation is greater than a threshold value. The output signal indicative of the pressure variation may be output to the user interface, and the user interface may present an indication that the difference between the fluid pressure and the target fluid pressure is greater than the threshold value (e.g., visually via the display, audibly via the speaker, etc.). While the output signals disclosed above are output to the user interface 68 in the illustrated embodiment, in certain embodiments, at least one output signal may be output to another suitable device/system (e.g., alone or in combination with the user interface), such as a remote control system, a remote monitoring system, another suitable device/system, or a combination thereof.

In certain embodiments, the seal/pressure monitoring system 48 includes at least one valve 77 communicatively coupled to the controller 54. The valve(s) 77 are configured to control the fluid pressure within the tubing spool 24/pressure within the tubing spool 24. In addition, the valve(s) may include any suitable type(s) of valve(s), such as gate valve(s), ball valve(s), needle valve(s), other suitable type(s) of valve(s), or a combination thereof. Furthermore, each valve may be actuated by any suitable type of actuator (e.g., solenoid, electric motor, hydraulic cylinder, hydraulic motor, etc.), and the controller may be communicatively coupled to the actuator of each valve. For example, the controller may be directly communicatively coupled (e.g., electrically coupled) to an electric actuator of the valve, or the controller may be indirectly communicatively coupled to a hydraulic or pneumatic actuator of the valve (e.g., via an electrical fluid control system). The controller 54 may be configured to control the valve(s) 77 based on the fluid pressure of the fluid within the tubing spool 24. For example, in response to determining the fluid pressure is greater than the target fluid pressure (e.g., by more than the threshold value), the controller 54 may control the valve(s) 77 to decrease the fluid pressure within the tubing spool 24. In addition, in response to determining the fluid pressure is less than the target fluid pressure (e.g., by more than the threshold value), the controller 54 may control the valve(s) 77 to increase the fluid pressure within the tubing spool 24. If the controller 54 is unable to substantially establish the target fluid pressure (e.g., a fluid pressure in which the difference between the fluid pressure and the target fluid pressure is less than or equal to the threshold value) by controlling the valve(s) 77, the controller 54 may output an output signal (e.g., to the user interface 68) indicative of instructions to inform the operator of the pressure variation. While controlling the valve (s) 77 based on the fluid pressure is disclosed above, in certain embodiments, the controller may be configured to control the valve(s) 77 based on the degree of engagement of the engageable seal 46. For example, in response to determining that the engageable seal 46 is not engaged (e.g., after controlling the actuator(s) 72 to engage the engageable seal 46), the controller may close the valve(s) 77 to block fluid flow through the tubing spool 24.

In certain embodiments, for determining fluid pressure, the seal/pressure monitoring system 48 may include a single sensor 50 positioned on the fluid side of the engageable seal 46 along the longitudinal axis 62 (e.g., the side of the engageable seal at which the fluid being monitored by the pressure monitoring system is located). However, in other embodiments, the seal/pressure monitoring system 48 may include multiple sensors 50 distributed along the longitudinal axis 62 and/or along the circumferential axis 64 of the tubing spool 24, in which each sensor is positioned on the fluid side of the engageable seal 46. In certain embodiments, the fluid pressure on both sides of the engageable seal may be monitored by the pressure monitoring system. In such embodiments, the seal/pressure monitoring system may include one or more sensors positioned on each side of the engageable seal along the longitudinal axis. Accordingly, an effectiveness of the engageable seal and/or a pressure differential across the engageable seal may be monitored during a production phase of the resource extraction system. Furthermore, as previously discussed, the seal monitoring system may include one or more sensors configured to facilitate determination of seal engagement/degree of seal engagement. The sensors used for seal engagement/degree of seal engagement determination may be the same sensors as the sensors used for pressure monitoring, the sensors used for seal engagement/degree of seal engagement determination may be entirely different than the sensors used for pressure monitoring, or one or more of the sensors used for seal engagement/degree of seal engagement determination may be the same sensors as one or more sensors used for pressure monitoring.

In addition, in certain embodiments, the controller may determine the fluid pressure of the fluid within the tubing spool multiple times during operation of the resource extraction system (e.g., after the controller determines that the seal is engaged, during fluid production, etc.). For example, the controller may determine the fluid pressure at a target frequency (e.g., once per hour, once per 30 minutes, once per 10 minutes, once per minute, once per 30 seconds, once per 15 seconds, 1 Hz, 5 Hz, 10 Hz, 50 Hz, etc.). Accordingly, the controller may determine a history or trend of fluid pressure during operation of the resource extraction system. For example, the controller may generate a table, a chart, a graph, or a combination thereof, of the fluid pressure within the tubing spool over time. Once the table/chart/graph is determined, the controller may output an output signal to the user interface indicative of the table/chart/graph, and the user interface may present a visual representation of the table/chart/graph (e.g., on the display). Additionally or alternatively, the controller may output an output signal indicative of each determined fluid pressure to the user interface, and the user interface, in turn, may present a visual representation of the determined fluid pressure. In certain embodiments, the pressure monitoring functionality of the seal/pressure monitoring system may be enabled via a subscription service, in which an operator pays a recurring fee to enable the controller to monitor the fluid pressure within the tubing spool.

In the illustrated embodiment, the seal/pressure monitoring system 48 includes a thermoelectric generator 78 and a battery 80. As illustrated, the battery 80 is electrically coupled to the controller 54, and the thermoelectric generator 78 is electrically coupled to the battery 80. The battery 80 is configured to provide electrical power to the controller 54, and the thermoelectric generator 78 is configured to provide electrical power to the battery 80. In the illustrated embodiment, the battery 80 is positioned at/proximate to the controller 54 (e.g., at/proximate to the tubing spool 24). However, in other embodiments, the battery may be positioned at a location remote from the controller (e.g., remote from the tubing spool). While the battery 80 is configured to receive electrical power from the thermoelectric generator 78 in the illustrated embodiment, in other embodiments, the battery may receive electrical power from remote electrical supply/supplies (e.g., alone or in combination with the thermoelectric generator), such as a surface electrical power system, a subsea electrical power system, a solar power system, other suitable type(s) of electrical power system(s), or a combination thereof. In such embodiments, the battery may provide electrical power to the controller in response to interruption of electrical power from the remote electrical supply/supplies.

The thermoelectric generator 78 is configured to generate electrical power in response to a temperature differential between the fluid within the tubing spool 24 and fluid within an environment external to the tubing spool (e.g., air, water, etc.). For example, hydrocarbon fluid (e.g., oil, natural gas, etc.) within the tubing spool 24 may be significantly warmer than the fluid (e.g., air, water, etc.) within the environment, thereby enabling the thermoelectric generator 78 to generate electrical power. In the illustrated embodiment, the thermoelectric generator 78 is configured to provide electrical power to the battery 80, and the battery 80 is configured to provide electrical power to the controller 54. However, in other embodiments, the thermoelectric generator may be directly electrically coupled to the controller (e.g., bypassing the battery). In such embodiments, the battery may be omitted. Furthermore, while providing electrical power from the thermoelectric generator and/or the battery to the controller is disclosed above, in certain embodiments, the thermoelectric generator and/or the battery may provide electrical power to other component(s) of the seal/pressure monitoring system, such as one or more sensors, the actuator(s), the valve(s), the user interface, other suitable component(s), or a combination thereof. Furthermore, other suitable electrical power system(s) may provide electrical power to the controller and/or other component(s) of the seal/pressure monitoring system (e.g., alone or in combination with the thermoelectric generator and/or the battery), such as a surface electrical power system, a subsea electrical power system, a solar power system, other suitable type(s) of electrical power system(s), or a combination thereof.

In the illustrated embodiment, the thermoelectric generator is coupled to the outer surface 52 of the tubing spool 24. However, in other embodiments, the thermoelectric generator may be coupled to an inner surface of the tubing spool, or the thermoelectric generator may be disposed within a wall of the tubing spool. Furthermore, in certain embodiments, the thermoelectric generator may be coupled to another suitable component of the resource extraction system that houses fluid at a temperature different than the temperature of the fluid surrounding the component. For example, the thermoelectric generator may be coupled to a different component than the sensor(s). Furthermore, while the seal/pressure monitoring system includes a single thermoelectric generator in the illustrated embodiment, in other embodiments, the seal/pressure monitoring system may include more or fewer thermoelectric generators (e.g., 0, 2, 3, 4, 5, 6, 7, 8, or more). In embodiments in which the seal/pressure monitoring system includes multiple thermoelectric generators, the thermoelectric generators may be coupled to the same component or different components.

Figure 3:
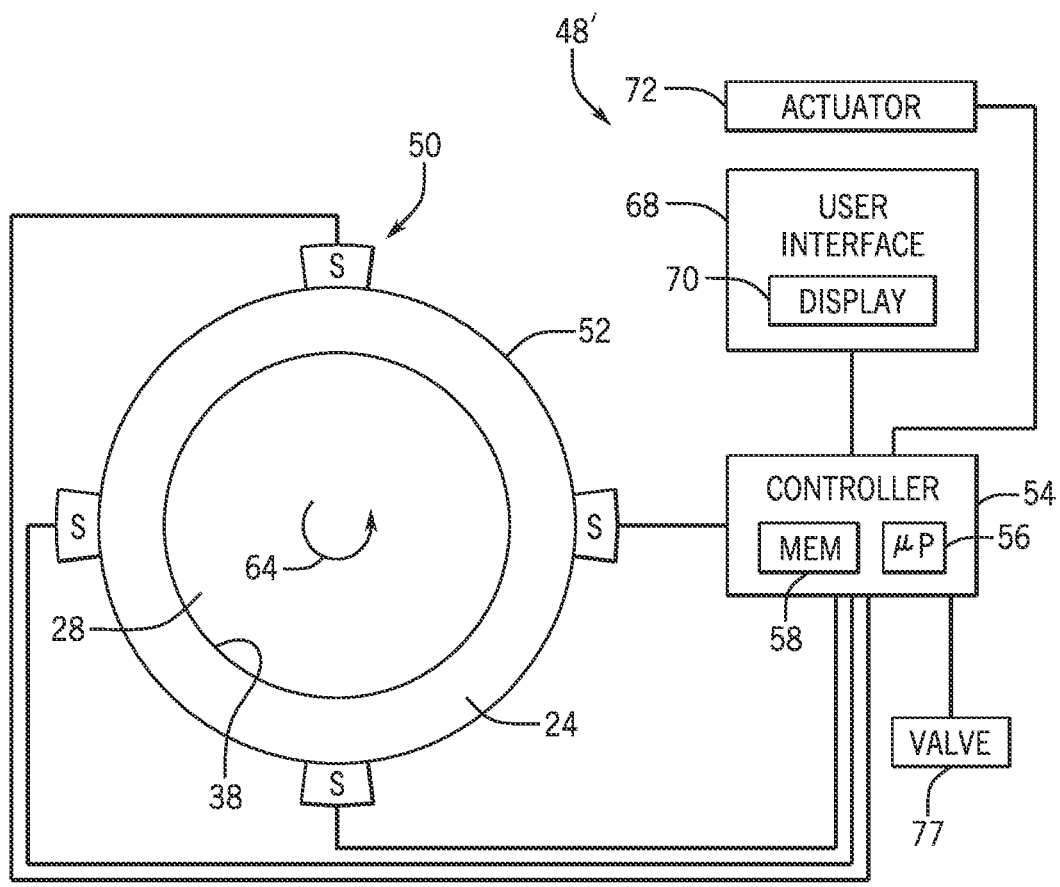
FIG. 3 is a top view of the tubing spool of FIG. 2 and a block diagram of an embodiment of a seal/pressure monitoring system.

FIG. 3 is a top view of the tubing spool 24 of FIG. 2 and a block diagram of an embodiment of a seal/pressure monitoring system 48'. In the illustrated embodiment, the seal/pressure monitoring system 48' includes multiple sensors 50 (e.g., contact sensor(s) and/or non-contact sensor(s)) distributed along the circumferential axis 64 of the tubing spool 24. For example, at least one sensor 50 (e.g., all of the sensors 50) may be coupled to the outer surface 52 of the tubing spool 24. While the seal/pressure monitoring system 48' includes four sensors 50 distributed along the circumferential axis 64 in the illustrated embodiment, in other embodiments, the seal/pressure monitoring system may include more or fewer sensors (e.g., 2, 3, 5, 6, 7, 8, or more) distributed along the circumferential axis. Because each sensor is positioned at a different location along the circumferential axis, each sensor may monitor the deformation of the tubing spool at the respective circumferential position.

With regard to seal monitoring, the controller 54 may determine that the engageable seal is not engaged (e.g., not sufficiently engaged, not fully engaged, etc.) in response to determining that the deformation varies (e.g., by more than a threshold amount) along the circumferential axis 64 (e.g., even if the deformation at the location of each sensor is greater than the threshold deformation). For example, a variation in deformation may be indicative of a tilted or uneven seal. In response to determining that the engageable seal is not engaged, the controller 54 may output an output signal indicative of non-engagement of the engageable seal to the user interface 68, and the user interface 68 may present an indication that the engageable seal is not engaged to the operator (e.g., visually via the display 70, audibly via the speaker, etc.). Additionally or alternatively, in response to determining that the engageable seal is not engaged, the controller 54 may control the actuator(s) 72 to drive the engageable seal into engagement.

Furthermore, with regard to pressure monitoring, the controller 54 may determine the fluid pressure of the fluid within the tubing spool 24 based on an average deformation of the tubing spool (e.g., in which the average deformation is determined by determining the deformation at the location of each sensor and averaging the deformations). Additionally or alternatively, the controller 54 may determine the fluid pressure of the fluid within the tubing spool 24 based on a maximum deformation monitored by the sensors. The controller 54 may also determine the fluid pressure of the fluid within the tubing spool 24 based on any other suitable analysis of the deformations monitored by the multiple sensors.

In certain embodiments, a single sensor 50 may be positioned at each circumferential location along the circumferential axis 64. Furthermore, in certain embodiments, the sensors 50 may be distributed along the circumferential axis 64, as shown, and along the longitudinal axis, as disclosed above with respect to the embodiment of FIG. 2.

For example, multiple sensors 50 may be distributed along the longitudinal axis at one or more circumferential locations along the circumferential axis 64. Additionally or alternatively, the sensors 50 may be arranged in any suitable pattern (e.g., spiral pattern, etc.) along the circumferential and longitudinal axes. The sensors 50 arranged along the longitudinal axis may function as disclosed above with respect to the embodiment of FIG. 2.

While the seal monitoring system is used to monitor the deformation of the tubing spool in the illustrated embodiment, in other embodiments, the seal monitoring system disclosed herein may be used to monitor the deformation of any other suitable housing (e.g., the casing spool, the wellhead hub, the tree, etc.) configured to receive an insert (e.g., a casing hanger, a tubing hanger, etc.) within an internal cavity of the housing, in which an engageable seal is configured to selectively establish a seal between the insert and the housing. In such embodiments, each sensor may output the sensor signal indicative of deformation of the housing, and the controller may determine the degree of engagement of the engageable seal based on the deformation of the housing.

In addition to determining the degree of engagement of the engageable seal, the seal monitoring system may determine when the insert (e.g., tubing hanger) is disposed (e.g., landed) within the internal cavity (e.g., tubing spool bore) of the housing (e.g., tubing spool) based on the deformation of the housing. For example, the controller may compare the deformation of the housing to another (e.g., second) threshold deformation. In addition, the controller may output an output signal indicative of presence of the insert within the internal cavity of the housing in response to determining that the deformation is greater than the other/second threshold deformation. Furthermore, in certain embodiments, the controller may determine whether the insert is tilted relative to the housing (e.g., by identifying a variation in deformation along the circumferential axis). In such embodiments, the controller may output an output signal indicative of the tilted insert (e.g., to the user interface and/or to a remote system).

Furthermore, while the pressure monitoring system is used to monitor the deformation of the tubing spool in the illustrated embodiment, in other embodiments, the pressure monitoring system disclosed herein may be used to monitor the deformation of any other suitable housing/fluid containment structure (e.g., the casing spool, the wellhead hub, the tree, a pipe, a hose, etc.). In such embodiments, each sensor may output the sensor signal indicative of deformation of the housing/fluid containment structure, and the controller may determine the fluid pressure of the fluid within the housing/fluid containment structure based on the deformation of the housing/fluid containment structure.

Furthermore, each of the communicative couplings (e.g., the communicative coupling between the sensor(s) and the controller, the communicative coupling between the controller and the user interface, and the communicative coupling between the controller and the actuator) disclosed above may be established by a wired or wireless connection. The wireless connection may utilize any suitable wireless communication protocol, such as Bluetooth, WiFi, radio frequency identification (RFID), a proprietary protocol, or a combination thereof. Furthermore, while determining the degree of engagement of the engageable seal without performing a pressure test is disclosed above, in certain embodiments, the seal monitoring system may also be configured to determine the degree of engagement of the engageable seal during the pressure test. For example, during a pressure test, the controller of the seal monitoring system may determine the degree of engagement of the engageable seal based on the deformation of the housing. Furthermore, in embodiments including one or more sensors positioned at location(s) along the longitudinal axis remote from the engageable seal, the controller may determine that a pressure test is being performed based on the deformation of the housing at the longitudinal location(s) remote from the engageable seal.

While the seal monitoring system and the pressure monitoring system are combined into a single system (e.g., the seal/pressure monitoring system) in the illustrated embodiment, in other embodiments, the seal monitoring system and the pressure monitoring system may be at least partially separate systems (e.g., completely separate systems). For example, the seal monitoring system and the pressure monitoring system may have separate controllers. Furthermore, in certain embodiments, the seal monitoring system and the pressure monitoring system may have separate user interfaces, and/or the seal monitoring system and the pressure monitoring system may have separate sensor(s). In addition, in certain embodiments, the seal monitoring system or the pressure monitoring system may be omitted (e.g., from the seal/pressure monitoring system disclosed above). As such, in certain embodiments, the seal/pressure monitoring system disclosed above may only function as a seal monitoring system, or the seal/pressure monitoring system disclosed above may only function as a pressure monitoring system. Furthermore, with regard to the seal monitoring system, the pressure monitoring system, and the seal/pressure monitoring system, in certain embodiments, the controller(s) may be configured to filter noise (e.g., interference from other source(s), etc.) within the sensor signal(s) using any suitable technique(s) to enhance the accuracy of the deformation determination.

Figure 4:
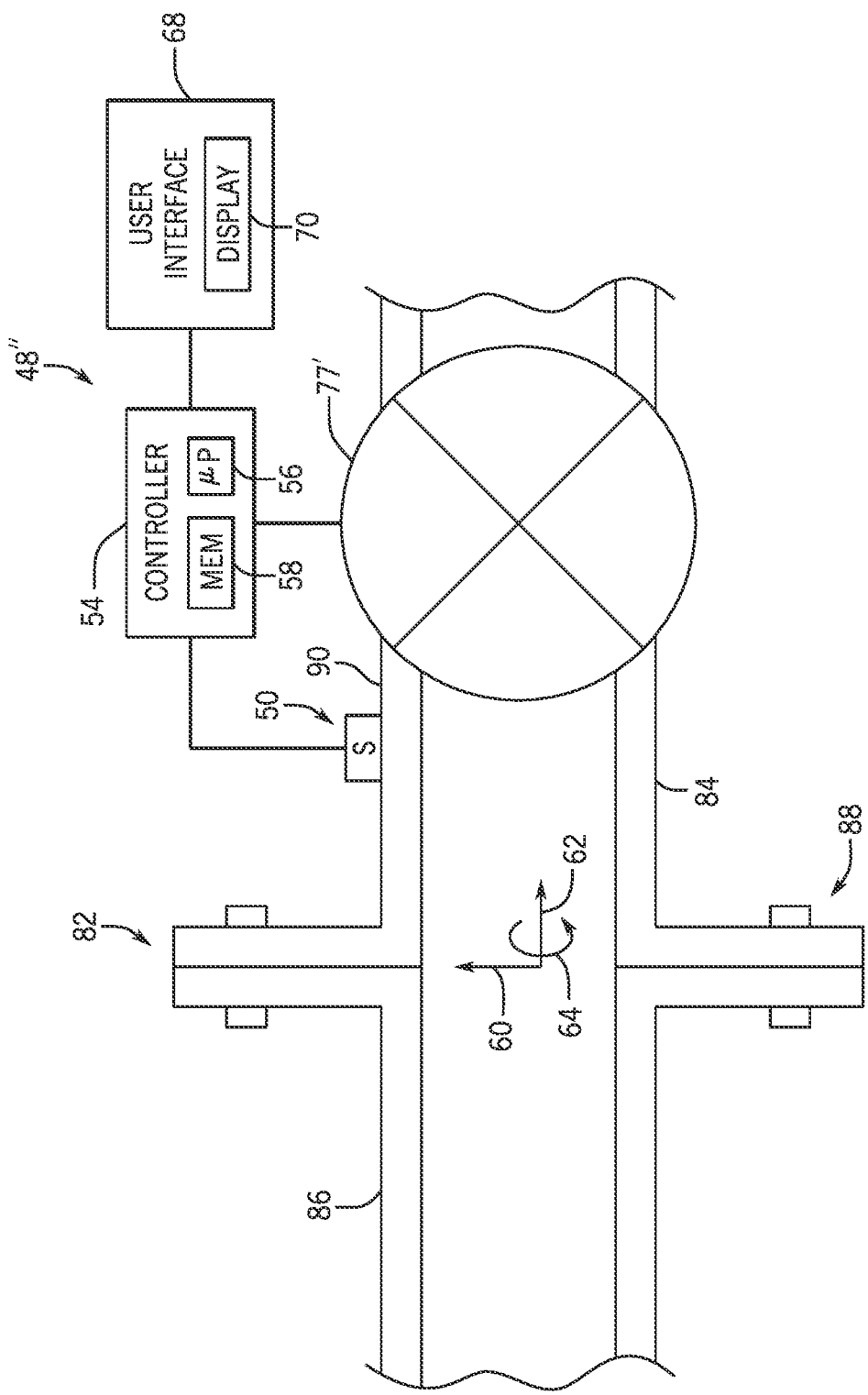
FIG. 4 is a cross-sectional view of a fluid conduit connection and a block diagram of an embodiment of a pressure monitoring system.

FIG. 4 is a cross-sectional view of a fluid conduit connection 82 and a block diagram of an embodiment of a pressure monitoring system 48". In the illustrated embodiment, the fluid conduit connection 82 is formed by a first pipe 84 and a second pipe 86. Furthermore, in the illustrated embodiment, the pipes are fluidly coupled to one another by a flange connection 88. However, in other embodiments, the pipes may be fluidly coupled to one another by another suitable type of connection, such as a threaded connection, a clamped connection, etc. Furthermore, while the fluid conduit connection 82 is formed by two pipes in the illustrated embodiment, in other embodiments, the fluid conduit connection may be formed by other suitable conduits, such as a pipe and a hose, two hoses, etc.

The controller 54 of the pressure monitoring system 48" is configured to determine a fluid pressure within the pipes based on the deformation of at least one pipe. In the illustrated embodiment, a single pressure sensor 50 is coupled to an outer surface 90 of the first pipe 84, and the pressure sensor 50 is configured to output a sensor signal indicative of deformation of the first pipe 84. The controller 54, which is communicatively coupled to the sensor 50 is configured to determine a fluid pressure within the pipes based on the deformation of the first pipe 84 (e.g., along the radial axis 60), and the controller 54 is configured to output an output signal (e.g., to the user interface 68) indicative of the fluid pressure. While the pressure monitoring system 48" includes a single pressure sensor 50 coupled to the first pipe 84 in the illustrated embodiment, in other embodiments, the pressure monitoring system may include multiple pressure sensors coupled to the first pipe and/or to the second pipe. For example, as previously discussed, multiple pressure sensors may be arranged along the longitudinal axis 62 and/or along the circumferential axis 64 of the pipe(s).

As previously discussed, in certain embodiments, the controller 54 is configured to compare the fluid pressure to a target fluid pressure. In such embodiments, the controller 54 is configured to output an output signal (e.g., second output signal) indicative of a pressure variation in response to determining a difference between the fluid pressure and the target fluid pressure is greater than a threshold value. The output signal indicative of the pressure variation may be output alone or in combination with the output signal indicative of the fluid pressure of the fluid within the pipes. A fluid pressure more than the threshold value below the target fluid pressure may be indicative of a fluid leak (e.g., at the fluid conduit connection 82, etc.) and/or an improper position of a valve 77' configured to control fluid flow through the pipes/pressure within the pipes. For example, if the controller determines the fluid pressure is more than the threshold value below the target fluid pressure, the controller may determine that the fluid conduit connection 82 is not effective. Furthermore, a fluid pressure more than the threshold value above the target fluid pressure may be indicative of an improper position of the valve 77' configured to control fluid flow through the pipe. The output signal indicative of the pressure variation may be output to the user interface 68, and the user interface 68 may present an indication that the difference between the fluid pressure and the target fluid pressure is greater than the threshold value (e.g., visually via the display 70, audibly via the speaker, etc.).

As previously discussed, the valve 77' is configured to control fluid flow through the pipes. In the illustrated embodiment, the valve 77' is configured to control fluid pressure within the pipes, and the valve 77' is communicatively coupled to the controller 54. The controller 54 is configured to control the valve 77' based on the fluid pressure of the fluid within the pipes. For example, in response to determining the fluid pressure is greater than the target fluid pressure (e.g., by more than the threshold value), the controller 54 may control the valve 77' to decrease the fluid pressure within the pipes. In addition, in response to determining the fluid pressure is less than the target fluid pressure (e.g., by more than the threshold value), the controller 54 may control the valve 77' to increase the fluid pressure within the pipes. If the controller 54 is unable to substantially establish the target fluid pressure (e.g., a fluid pressure in which the difference between the fluid pressure and the target fluid pressure is less than or equal to the threshold value) by controlling the valve 77', the controller 54 may output an output signal (e.g., to the user interface 68) indicative of instructions to inform the operator of the pressure variation.

Because the fluid pressure within the fluid containment structure is determined by monitoring the deformation of the fluid containment structure, the fluid pressure within the fluid containment structure may be monitored from a remote location, thereby obviating use of an underwater remote operated vehicle (ROV) to monitor the fluid pressure within a subsea fluid containments structure or obviating the process of traveling to a surface fluid containment structure to visually monitor pressure gauge(s) at the fluid containment structure. As a result, the costs and complexity associated with monitoring fluid pressure may be substantially reduced. Furthermore, because the pressure monitoring system is configured to determine the fluid pressure within the fluid containment structure without a pressure gauge, an opening in the fluid containment structure for the pressure gauge may be obviated. As a result, the possibility of fluid leakage at the opening may be eliminated. In addition, various valve(s) and/or seal(s) at the opening may be obviated, thereby reducing the cost and complexity of monitoring fluid pressure within the fluid containment structure.

While controlling the valve 77' is disclosed herein, in certain embodiments, the controller may control other and/or additional elements based on the fluid pressure within the fluid containment structure (e.g., the pipes, the tubing spool, etc.). By way of example, the controller may control a bleed down pressure system and/or an electrical power system based on fluid pressure within the fluid containment structure. For example, the controller may terminate electrical power to at least a portion of a resource extraction system in response to determining the fluid pressure within the fluid containment structure is greater than the target fluid pressure (e.g., by more than the threshold value), which may cause one or more fail-close valves to automatically close.

Furthermore, in certain embodiments, the strain and/or pressure data collected by the seal/pressure monitoring system may be used within a simulation of the resource extraction system. For example, a simulation of the resource extraction system may be used to determine expected maintenance operations, thereby enhancing operational planning and maintenance operations for the resource extraction system. The strain and/or pressure data from the seal/pressure monitoring system may be used by the simulation to enhance the accuracy of the expected maintenance operations determination.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A seal monitoring system, comprising:
   at least one sensor configured to couple to an outer surface of a housing and to output a sensor signal indicative of deformation of the housing, wherein the housing is configured to receive an insert within an internal cavity of the housing, and an engageable seal is configured to selectively establish a seal between the insert and the housing; and
   a controller communicatively coupled to the at least one sensor, wherein the controller comprises a memory and a processor, the controller is configured to:
      determine a fluid pressure within the housing based on the deformation of the housing and output a first output signal indicative of the fluid pressure; and
      control a valve based on the determined fluid pressure, the valve being configured to control the fluid pressure within the housing.

2. The seal monitoring system of claim 1, wherein the at least one sensor comprises a plurality of sensors distributed along a circumferential axis of the housing, along a longitudinal axis of the housing, or a combination thereof.

3. The seal monitoring system of claim 1, wherein the controller is communicatively coupled to the at least one sensor by a wireless connection.

4. The seal monitoring system of claim 1, wherein the at least one sensor is configured to couple to the housing via at least one fastener, a threaded connection, an adhesive connection, a strap extending around a tubing spool, or a combination thereof.

5. The seal monitoring system of claim 1, wherein the at least one sensor comprises a strain gauge, a strain meter, or a combination thereof.

6. The seal monitoring system of claim 1, wherein the controller is configured to compare the fluid pressure to a target fluid pressure, and the controller is configured to output a third output signal indicative of a pressure variation in response to determining a difference between the fluid pressure and the target fluid pressure is greater than a threshold value.

7. The seal monitoring system of claim 1, wherein the controller is configured to determine a degree of engagement of the engageable seal based on the deformation of the housing and output a second output signal indicative of the degree of engagement of the engageable seal.

8. The seal monitoring system of claim 7, wherein the controller is configured to determine the degree of engagement of the engageable seal based on the deformation of the housing, the controller is configured to compare the deformation of the housing to a threshold deformation, and the controller is configured to output a fourth output signal indicative of engagement of the engageable seal in response to determining that the deformation is greater than the threshold deformation.

9. The seal monitoring system of claim 7, wherein the controller is configured to determine the degree of engagement of the engageable seal based on the deformation of the housing, the controller is configured to control an actuator based on the determined degree of engagement of the engageable seal, and the actuator is configured to control the degree of engagement of the engageable seal.

10. A seal monitoring system, comprising:
at least one sensor configured to couple to an outer surface of a housing and to output a sensor signal indicative of deformation of the housing, wherein the housing is configured to receive an insert within an internal cavity of the housing, and an engageable seal is configured to selectively establish a seal between the insert and the housing; and
a controller communicatively coupled to the at least one sensor, wherein the controller comprises a memory and a processor, the controller is configured to;
determine a degree of engagement of the engageable seal based on the deformation of the housing, and the controller is configured to output an output signal indicative of the degree of engagement of the engageable seal; and
control an actuator based on the determined degree of engagement of the engageable seal, wherein the actuator is configured to control the degree of engagement of the engageable seal.

11. The seal monitoring system of claim 10, wherein the at least one sensor comprises a plurality of sensors distributed along a circumferential axis of the housing, along a longitudinal axis of the housing, or a combination thereof.

12. The seal monitoring system of claim 10, wherein the controller is configured to compare the deformation of the housing to a threshold deformation, and the controller is configured to output a second output signal indicative of engagement of the engageable seal in response to determining that the deformation is greater than the threshold deformation.

13. The seal monitoring system of claim 10, wherein the controller is communicatively coupled to the at least one sensor by a wireless connection.

14. A pressure monitoring system, comprising:
at least one sensor configured to couple to an outer surface of a fluid containment structure and to output a sensor signal indicative of deformation of the fluid containment structure; and
a controller communicatively coupled to the at least one sensor, wherein the controller comprises a memory and a processor, the controller is configured to;
determine a fluid pressure within the fluid containment structure based on the deformation of the fluid containment structure, and the controller is configured to output an output signal indicative of the fluid pressure; and
control a valve based on the determined fluid pressure, the valve being configured to control the fluid pressure within the fluid containment structure.

15. The pressure monitoring system of claim 14, wherein the at least one sensor comprises a plurality of sensors distributed along a circumferential axis of the fluid containment structure, along a longitudinal axis of the fluid containment structure, or a combination thereof.

16. The pressure monitoring system of claim 14, wherein the controller is configured to compare the fluid pressure to a target fluid pressure, and the controller is configured to output a second output signal indicative of a pressure variation in response to determining a difference between the fluid pressure and the target fluid pressure is greater than a threshold value.

17. The pressure monitoring system of claim 14, wherein the at least one sensor comprises a strain gauge, a strain meter, or a combination thereof.

18. The pressure monitoring system of claim 14, wherein the controller is communicatively coupled to the at least one sensor by a wireless connection.

\* \* \* \* \*